H. ARTHUR.
Vegetable Grater.
No. 69,607.
2 Sheets—Sheet 1.
Patented Oct. 8, 1867.
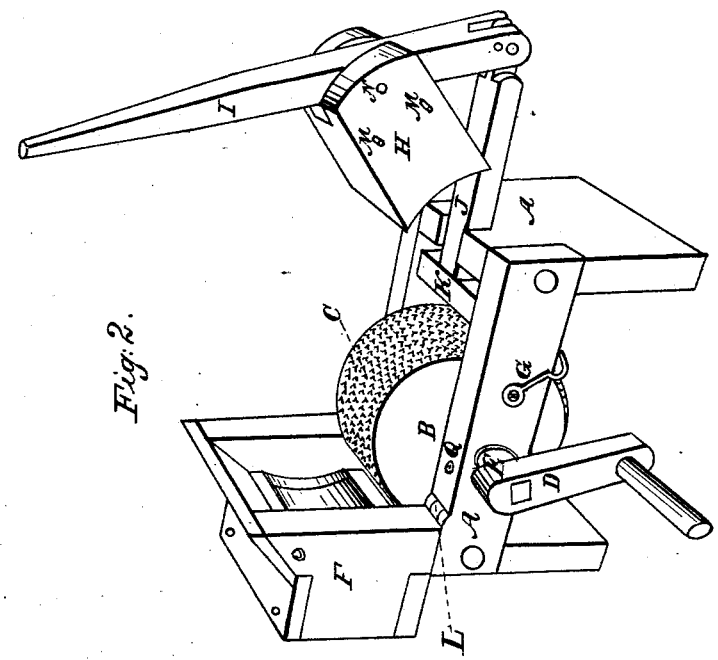
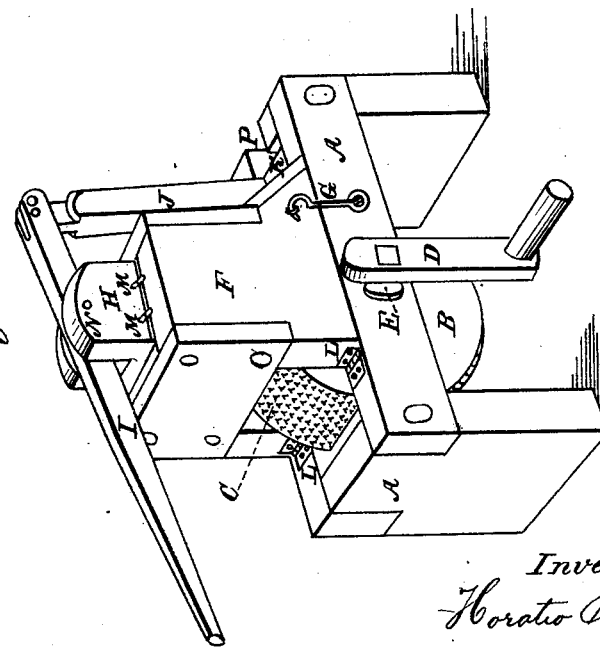
Witnesses:
Inventor:
Horatio Arthur

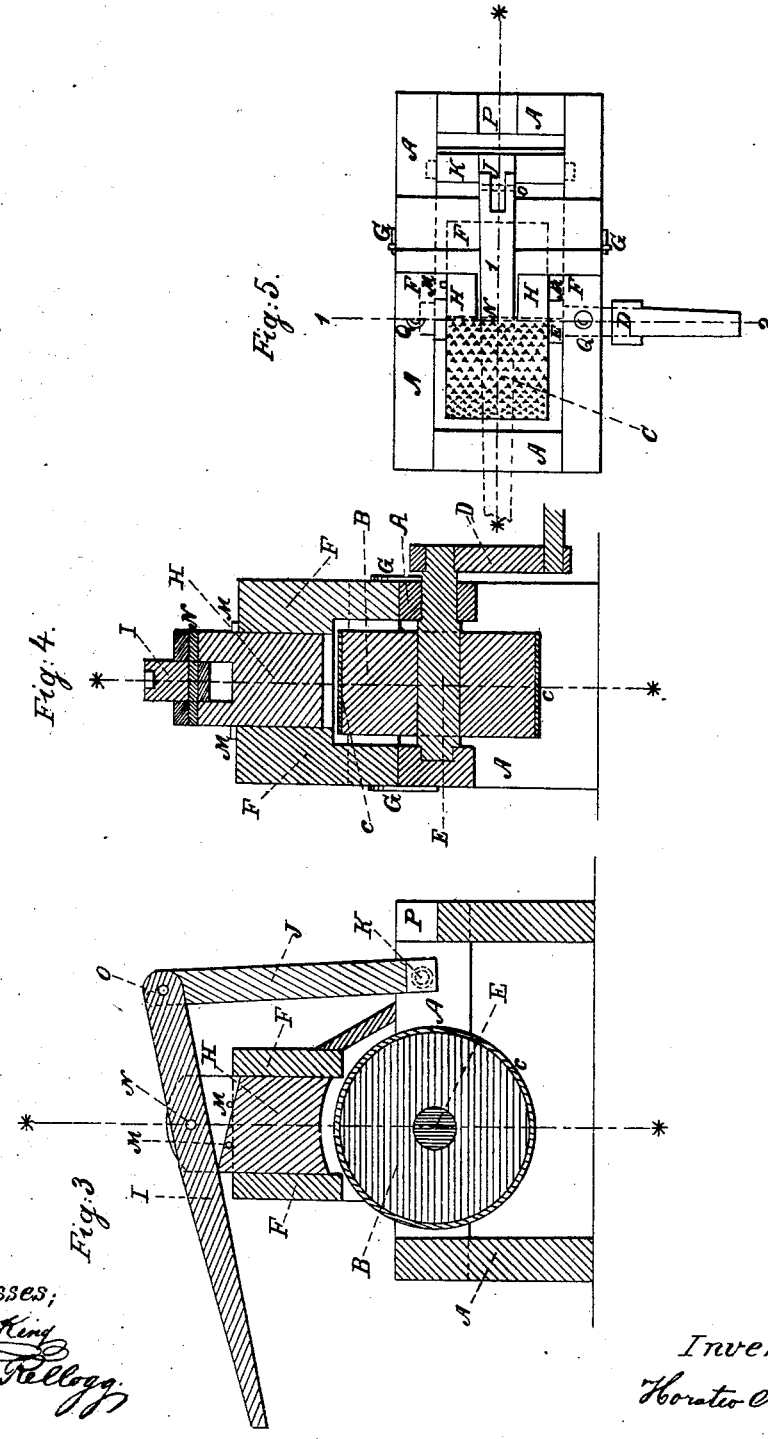

United States Patent Office.

HORATIO ARTHUR, OF MARTINSBURG, NEW YORK.

Letters Patent No. 69,607, dated October 8, 1867.

IMPROVEMENT IN MACHINE FOR GRATING VEGETABLES.

The Schedule referred to in these Letters Patent and making part of the same.

Be it known that I, HORATIO ARTHUR, of Martinsburg, in the county of Lewis, and State of New York, have invented a new and useful Improvement on Machines for Grating Vegetables, such as the potato for starch, the beet for sugar, horse-radish for pickles, cocoa-nut for confectionery, &c., &c., and especially useful to the dairyman in enabling him rapidly to grate carrots, so as to facilitate the extraction of the color therefrom, said color being usually imparted to butter at that period of the year when the pasturing season is over, a period of from six to seven months in the northern States. That my invention will be of importance to the northern farmers is certain, when it is known that a dairy of cows of from one hundred and twenty to one hundred and fifty in number require a daily amount of carrot extract that requires a length of time of from two to two and one-half hours to do the grating of, and which my invention will accomplish in from twenty to twenty-five minutes, besides doing the same in a more effectual manner.

I do hereby declare that the following is a full, clear, and exact description of the construction and operation of the same, reference being had to the annexed drawings, making a part of this specification, in which—

Figure 1 is a perspective view of the machine at work.

Figure 2, a perspective view of the machine open, showing the hopper thrown back and the plunger or follower and lever removed..

Figure 3 is a longitudinal section.

Figure 4 is a transverse section.

Figure 5 represents two half plans, one half plan showing the grater, and one half showing the hopper and plunger or follower and lever.

In each of which drawings, A is the frame or stand; B, a wooden circular block or wheel; C, the rasp-sheeting around the wheel; D, winch-handle fastened to axle E of wheel; E, the axle of the wheel B; F, the hopper in which the plunger or follower fits; G, hooks to secure the hopper F to the frame A; H, the plunger or follower; I, the lever fastened to the plunger H by the pin N, and connected with the upright bar J by the pin O; J, the upright bar connected with the lever I, and also framed into the transverse piece K; K, the transverse piece framed into the bar J, and movable on gudgeons formed on its ends, and let into sockets in the frame or stand; L, hinges connecting the hopper with the frame or stand, so as to open it (the hopper) up for the purposes of cleaning or examining the rasp-wheel, as shown in fig. 2; M M, stops to prevent the plunger or follower from being forced down by the lever I further than the required space to be preserved between the periphery of the rasp-wheel and the under surface of the plunger or follower, as shown more particularly on fig. 3; N, the pin securing the lever I to the plunger or follower H; O, the pin securing the joint between the lever I and bar J; P, a notch cut out of one end of the frame or stand A, so as to form a seat or rest for the bar J when the plunger or follower and lever is withdrawn from the hopper F, as shown in the perspective, fig. 2. Q is an oil-hole in the sides of the frame or stand, and drilled over the axle E of the grater-wheel B, for the purpose of lubricating the axle.

The nature of my invention consists in providing the ordinary hopper attached to grating machines with a plunger or follower fitting into same, and connected with a lever, whereby the vegetables are forced home against the revolving grater more completely than they could be by the simple gravitation of themselves, as in the ordinary machines, and thus, with the lever, creating a power that can be maintained and regulated at the will of the operator.

I construct my grating machine in any of the known forms, as in the illustrations forming part of this specification, where the grating-surface C is made of perforated sheet tin, with the smooth surface fastened in contact with the periphery of the wooden drum B, and the rough or grating-surface on the outside forming thus a circular rasp mounted on the wooden frame A, and revolving on the axle E by turning the winch-handle D. On the upper part of this frame is hinged the hopper F by the hinges L, which hopper consists of a wooden boxing, as represented on the drawings, and is secured by the hooks G when the machine is being worked. This hopper is thrown square open by unhooking, and rests, when so opened, on the frame or stand, as shown in fig. 2. When the vegetables to be grated are placed in the hopper, the plunger or follower H, which fits into the boxing or hopper F, is forced down by the lever I with one hand of the operator, while with the other he turns the winch-handle D. By this means the vegetables are forced constantly in contact with the grating-surface C of the wheel B, and with a power and uniformity of pressure altogether at the will of the operator, and thus each successive charge of the hopper is rapidly grated. When a charge of the vegetables is grated the plunger or follower is brought down to the position shown in the perspective drawing, fig. 1, below which point it is prevented from being forced down by the stop-pegs M M, which are at this time in contact with the surface of the hopper-boxing. These stops are so placed that a small space is preserved between the grating-surface and the bottom of the plunger or follower, which bottom surface is concentric with the circumference of the grater. The lever I is jointed to an upright bar, J, and secured thereto by a pin, O, and the bar J is tenoned fixedly into the transverse piece K, which transverse piece has gudgeons on its ends that turn freely in sockets provided for them in the inner sides of the frame or stand A. There is a square notch, P, cut out of one end of the frame or stand A, which forms a rest for the bar J when thrown back, as shown in fig. 2. This bar, when so thrown back, forms a rest for the plunger or follower and lever, as also shown on said fig. 2.

What I claim as my invention, and desire to secure by Letters Patent, is—

The combination herein described for grating vegetables, using for that purpose the arrangement illustrated and specified.

HORATIO ARTHUR.

Witnesses:
 Martin King,
 K. Collins Kellogg.